May 3, 1932.  R. S. HEISE  1,856,996
RELIEF VALVE
Filed July 5, 1928

Inventor:
Roscoe S. Heise,
By
Attorneys.

Patented May 3, 1932

1,856,996

UNITED STATES PATENT OFFICE

ROSCOE S. HEISE, OF DAYTON, OHIO

RELIEF VALVE

Application filed July 5, 1928. Serial No. 290,316.

This invention relates to relief valves and the like, and is particularly adapted to be used in connection with electric ovens where pressure developing within the oven, due to the formation of steam, requires that it be released, and where later, upon cooling of the oven, condensation of steam within the oven causes a vacuum which also must be relieved to prevent damage to the oven.

These and other objects, as will hereinafter appear, are accomplished by this invention which is fully described in the following specification and shown in the accompanying drawings, in which—

Figure 1:
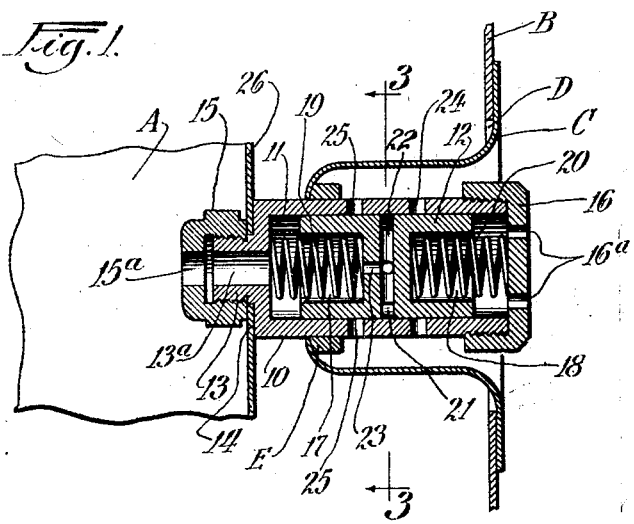
Figure 1 is a longitudinal section through a pressure valve embodying the invention and showing the valve in the normal or inoperative position.

The embodiment illustrated comprises a valve body or barrel 10 having an opening forming a longitudinal chamber 11 which is preferably cylindrical in form and which is machined to receive a piston 12 slidably mounted therein. The inner end of the barrel 10 is partially closed and is provided with an extension 13 which is smaller so as to form a shoulder 14 thereon, the extension 13 being screw-threaded to receive a nut 15. The nut 15 and extension 13 are provided with openings 15$^a$ and 13$^a$ respectively. The outer end of the barrel 10 is also screw-threaded to accommodate a threaded cap 16. The cap 16 is provided with vent holes 16$^a$ so as to permit free movement of the piston 12, as will hereinafter be described.

The piston 12 is provided with depressions 17 and 18 at its two ends which are adapted to receive springs 19 and 20 which are in compression with the opposite ends bearing upon the inner end of the barrel 10 and the inner surface of the cap 16. These springs hold each other mutually in compression so that when the valve is not acted upon by any outside force, the piston 12 assumes a normal intermediate position as shown in Fig. 1.

Figure 2:
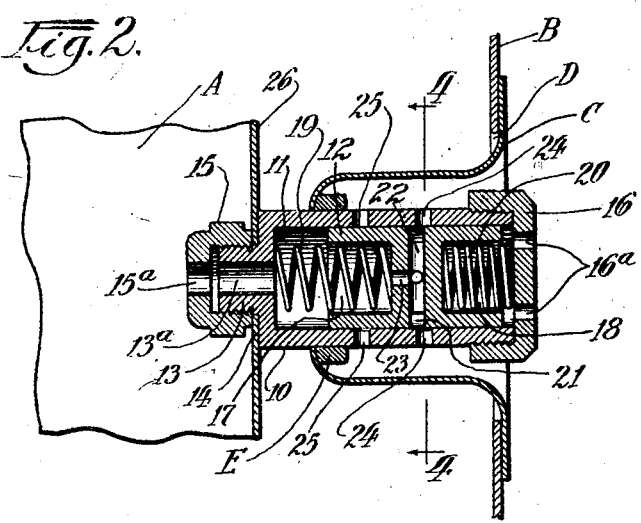
Fig. 2 is a similar view showing the valve pressed outwardly by steam or gas pressure within the oven.
Figure 3:
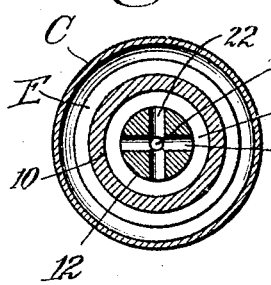
Fig. 3 is a section on the line 3—3 of Fig. 1.
Figure 4:
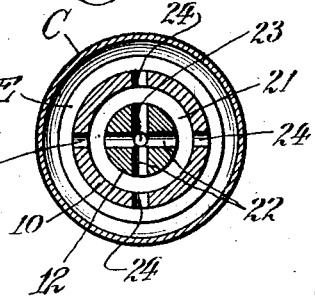
Fig. 4 is a section on the line 4—4 of Fig. 2.
Figure 5:
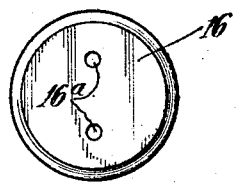
Fig. 5 is an end view showing the outer end of the valve cap.

The piston 12 is provided with an annular groove 21 which communicates with the depression 17 through a series of transverse passages 22 and a longitudinal opening 23. The barrel 10 is provided with a series of openings 24 (see Fig. 4) which are adapted to register with the groove 21 when the piston 12 is moved outwardly to the position shown in Fig. 2. A similar set of openings 25 is also provided which are adapted to be placed in communication with the groove 21 when the piston is forced back in the opposite direction as will later be described.

This pressure-operated valve is especially adapted to be used as a relief valve for ovens, particularly electric ovens, fireless cookers and the like. When so used, the reduced portion 13 of the barrel is passed through a suitable opening in the sheet metal lining 26 of the oven A which is surrounded usually by a sheet metal housing B. I have provided a cuplike member C which extends through an opening D in the housing B. The member C tightly surrounds the barrel 10 and is secured thereon by means of a ring E which tightly surrounds the barrel 10 and is frictionally held thereon.

The operation of the valve is as follows: The oven A is tightly sealed previous to being heated so that when steam pressure is generated therein, it is necessary to provide means for relieving it. This pressure acting upon the piston 12 will force it from the normal position shown in Fig. 1 to the operative position shown in Fig. 2, in which the groove 21 is brought into registration with the openings 24. Pressure will thus be relieved, steam from the oven A passing through the openings 23 and 22 and the groove 21 to the openings 24 and thence to the atmosphere.

Much of the air previously contained in the oven A will mix with the steam and will pass out to the atmosphere in this manner so that as long as the steam pressure is maintained within the oven A, the oven will be filled principally with steam. When, therefore, the generation of steam ceases, and the oven is permitted to cool off, this steam will condense and a vacuum will thus be produced within the oven A. When this happens, the valve will act in a reverse direction to relieve the vacuum thus produced. This is accomplished by the pressure of the atmosphere which is now greater than the pressure within the oven, forcing the piston 12 back so as to compress the spring 19 until the groove 21 in the piston 12 is brought into registration with the openings 25. When this occurs, a leak of air therethrough into the groove 21 and thence through the passages 22 and 23 occurs which eventually brings an equalization of pressure within the oven A with that of the atmosphere surrounding same.

While I have shown and described but a single embodiment of my invention, it is to be understood that it is capable of many modifications. Changes, therefore, in the construction and arrangement may be made which do not depart from the spirit and scope of the invention as covered by the appended claims.

I claim:

1. A relief valve comprising a barrel, a piston slidable therein, a spring on each side of said piston tending to maintain it in a neutral position, passages in the piston and barrel which are normally out of registration with each other when the piston is in the neutral position but may be brought into registration when said piston is moved in either direction by pressure from said neutral position so as to permit gas on either side of the valve to pass the valve.

2. A relief valve comprising a barrel, a piston slidable therein, a spring on each side of said piston tending to maintain it in a neutral position, a passage in said piston, a plurality of passages in said barrel either of which is adapted to register with said passage in piston when the piston is moved a predetermined distance, said passages being out of registration when the piston is in the neutral position.

3. A relief valve comprising a chamber, a piston slidable therein, yieldable means acting upon said piston tending to maintain same at an intermediate point thereof and oppose movement in either direction, one end of said chamber being open to the atmosphere, the other being adapted to communicate with a closed vessel, a channel in said piston between the periphery thereof and the side adjacent said vessel, said chamber being provided with openings to the atmosphere on either side of the normal position of said channel and adapted to register therewith when the piston is displaced a predetermined amount in either direction.

In testimony whereof, I have hereunto set my hand and affixed my seal this 15th day of June, 1928.

ROSCOE S. HEISE.